(12) United States Patent
Seki et al.

(10) Patent No.: US 8,194,222 B2
(45) Date of Patent: Jun. 5, 2012

(54) DISPLAY DEVICE AND TIMEPIECE

(75) Inventors: Shigeaki Seki, Nagano-ken (JP); Kenichi Okuhara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 784 days.

(21) Appl. No.: 12/257,942

(22) Filed: Oct. 24, 2008

(65) Prior Publication Data

US 2009/0122653 A1 May 14, 2009

(30) Foreign Application Priority Data

Nov. 8, 2007 (JP) ................................ 2007-290684

(51) Int. Cl.
*G02F 1/1345* (2006.01)
*G04C 19/00* (2006.01)

(52) U.S. Cl. ............................ 349/149; 349/152; 368/84

(58) Field of Classification Search .................... 368/82, 368/84, 88, 239, 241, 242; 349/149–152
See application file for complete search history.

(56) References Cited

U.S. PATENT DOCUMENTS

| | | | | |
|---|---|---|---|---|
| 5,362,547 A | * | 11/1994 | Yamazaki | 428/167 |
| 5,760,862 A | * | 6/1998 | Bachus | 349/149 |
| 6,069,679 A | * | 5/2000 | Joslin et al. | 349/149 |
| 6,441,882 B1 | | 8/2002 | Yoshioka | |
| 6,498,636 B1 | * | 12/2002 | Mathew et al. | 349/187 |
| 6,613,599 B2 | * | 9/2003 | Imaeda | 438/30 |
| 6,780,493 B2 | | 8/2004 | Noda et al. | |
| 6,867,496 B1 | * | 3/2005 | Hashimoto | 257/771 |
| 7,432,451 B2 | * | 10/2008 | Yamada | 174/260 |
| 7,548,366 B2 | | 6/2009 | Takei | |
| 7,911,574 B2 | * | 3/2011 | Imajo et al. | 349/149 |
| 2001/0000763 A1 | | 5/2001 | Muramatsu | |
| 2004/0046909 A1 | | 3/2004 | Sekiguchi | |
| 2004/0224598 A1 | | 11/2004 | Tanaka | |
| 2005/0174341 A1 | * | 8/2005 | Johnson et al. | 345/204 |
| 2006/0284794 A1 | | 12/2006 | Johnson et al. | |
| 2007/0052665 A1 | * | 3/2007 | Zhou et al. | 345/107 |

FOREIGN PATENT DOCUMENTS

| | | |
|---|---|---|
| CN | 1211160 | 3/1999 |
| CN | 1291730 A | 4/2001 |
| EP | 1 845 426 A1 | 10/2007 |
| JP | 55-154485 | 2/1980 |
| JP | 60-78188 | 5/1985 |
| JP | 11-052406 | 2/1999 |
| JP | 2001-305246 | 10/2001 |
| JP | 2007-505348 | 3/2007 |
| JP | 2007-133182 | 5/2007 |
| WO | 00/70395 | 11/2000 |
| WO | 03/093900 A1 | 11/2003 |

* cited by examiner

*Primary Examiner* — Vit Miska (57) ABSTRACT

A display device that has a display panel having a front substrate, an image forming unit, and a back substrate rendered together in layers, and a wiring board layered on the back surface of the back substrate. A plurality of input/output pins are formed on the front surface of the back substrate, and a plurality of connection pins that are electrically connected to the input/output pins by respective conductor members are formed on the back surface of the wiring board.

7 Claims, 7 Drawing Sheets

DISPLAY DEVICE AND TIMEPIECE

CROSS-REFERENCE TO RELATED APPLICATIONS

Japanese Patent application No. 2007-290684 is hereby incorporated by reference in its entirety.

BACKGROUND

1. Field of Invention

The present invention relates to a display device and a timepiece.

2. Description of Related Art

A display device according to the related art as depicted in Japanese Unexamined Patent Appl. Pub. JP-A-2007-133182 bonds the terminal portions of a wiring board overlapping the conductor portions of the display panel disposed outside the display area. These conductor portions and wiring board each have a plurality of pins, and adhesion by an anisotropic conductive film is used to connect the pins of the conductor portion with the pins of the wiring board.

The display panel has a top substrate, a transparent electrode formed on the top substrate, a bottom substrate on which the pixel electrodes are formed, and an image forming layer including liquid crystals or electrophoretic particles rendered between the transparent electrode and the pixel electrodes. The image forming layer is sealed by epoxy, for example, disposed along the outside edge of the image forming layer sealing the gap between the top and bottom substrates.

A flexible circuit board is often used for the wiring board. The wiring board extends substantially along the display surface of the display panel from the end of the conductor portions of the display panel to which it is connected. The plural pins disposed to the other end of the wiring board are connected to a device-side circuit board by connectors.

In the construction of the related art in which the display panel and wiring board are connected between the plane surfaces thereof, a substrate connection portion for connecting the display panel and the wiring board is required outside the image display area of the display panel.

This substrate connection area must be outside the sealing member for reasons including conduction stability, and the size of the frame area surrounding the image display area is increased by the size of this seal plus the size of the substrate connection area. This degrades the appearance and increases the size of the device in which the display device is incorporated by the area of this frame.

Because the display module including the top substrate, image forming layer, and back substrate is separate from the wiring board, the housing structure for the display module and wiring board each take up space inside the device. This is particularly disadvantageous in devices in which space is at a premium, such as in a wristwatch.

In order to save space the flexible wiring board connected to the pins of the display panel could be folded over to overlap the back side of the display panel. However, the wiring board can only be folded over in this manner when the display panel and wiring board are sufficiently separated, and this actually requires even more space.

Because the wiring board and display panel are connected in the plane direction, the pins on the main circuit board of the device disposed on the back side of the display panel and the pins of the wiring board must normally be connected together by connectors. This means that the pin positions of the display device must correspond to the pin positions of the device, and wide applicability is thus impaired.

Furthermore, when the pins of the wiring board and the pins of the device-side circuit board are connected by individual connectors, connecting and disconnecting the wiring board from the device-side circuit board during initial assembly and after-sale service is difficult.

SUMMARY OF INVENTION

A first aspect of the invention is a display device that enables narrowing the frame area around the image display area while also reducing the space needed for installation in a device or product, improves the utility of the positions of the pins connected to the device-side circuit board, and affords easier connection and disconnection of the display device to the device-side circuit board. Another aspect of the invention is a timepiece having this display device.

A first aspect of the invention is a display device having a display panel having a front substrate, an image forming unit, and a back substrate rendered together in layers, and a wiring board layered on the back surface of the back substrate. A plurality of input/output pins are formed on the front surface of the back substrate, and a plurality of connection pins that are electrically connected to the input/output pins by respective conductor members are formed on the back surface of the wiring board.

By rendering the display panel and wiring board layered together, the input/output pins on the front of the back substrate and the connection pins can be electrically connected through the thickness of the back substrate by suitable conductor members such as wiring members or leads. More specifically, the display panel and wiring board in this embodiment of the invention are not connected in the plane direction, a connection area between the ends of the wiring board and the display panel is not needed outside the image display area, and only enough area for the input/output pins and the connection pins is needed outside the image display area. As a result, the area outside the image display area, that is, the frame portion, can be extremely narrow.

Furthermore, by rendering the display panel and the wiring board as a single module, less space is needed to house them inside a product.

In addition, by layering the wiring board with the display panel, the pins connected to the product-side circuit board can be formed at any suitable position on the back side of the wiring board, and the display device of the present invention can be easily assembled into a wide range of products and devices. Appropriately positioning the pins also helps to reduce the product size.

By forming the connection pins on the back side of the wiring board, the connection pins and the pins of the device-side circuit board can be electrically connected through a conductive member rising vertically to the back surface of the wiring board, for example. Because the display panel and wiring board are also rendered as a single module as a stand-alone component, removing the display device from and installing the display device to a product during after-sales service is simple.

A glass epoxy circuit board that is less expensive than a flexible circuit board can also be used for the wiring board.

In a display device according to another aspect of the invention the image forming unit is preferably formed containing electrophoretic particles.

This aspect of the invention helps to further reduce the size and thickness of the display device and the device or product in which the display device is used by combining the thinness of an electrophoretic display with the narrow frame portion described above.

The appearance can also be further improved by rendering a narrow frame around an electrophoretic display, which can be used for a high contrast, high resolution display.

Yet further preferably, the conductor members are bonding wires.

By using bonding wires, this aspect of the invention enables connecting the input/output pins formed on the front side of the back substrate with the connection pins formed on the back side of the wiring board in less space in the plane direction of the display panel. As a result, the frame portion can be rendered even narrower.

Yet further preferably, the image forming unit is sealed between the front substrate and the back substrate by a sealing member disposed in an area including the outside edge part of the image forming unit, and the sealing member covers the conductor members.

By using the same sealing member to seal the image forming unit and the conductor members, this aspect of the invention further simplifies the construction.

In another aspect of the invention the wiring board is a double-sided circuit board having conductors on both front and back surfaces, and the connection pins have through-holes passing through the wiring board.

By thus using a double-sided circuit board (which includes multilayer circuit boards) for the wiring board, more electronic components can be easily mounted than if a single-sided circuit board is used.

In addition, the input/output pins formed on the front side of the back substrate and the connection pins formed on the back side of the wiring board can be easily interconnected through through-holes.

Further preferably, a drive circuit that drives the display panel is disposed on the back surface of the wiring board.

Compared with the display panel drive circuit being mounted on a device-side circuit board, this aspect of the invention shortens the length of the wiring pattern connecting the display panel to the drive circuit, thereby reduces conductive resistance, and thus reduces power consumption.

The connection pins connected through the through-holes to the back side of the wiring board are connected to this drive circuit.

Yet further preferably, a temperature sensor is disposed on the back surface of the wiring board.

This aspect of the invention can ensure the display quality of the display panel by controlling driving the display panel according to the temperature detected by the temperature sensor.

The invention is thus particularly effective when applied to an electrophoretic display, the display characteristics of which are easily affected by changes in temperature.

The temperature sensor is preferably disposed at a position corresponding to the image forming unit.

In another aspect of the invention the display device is incorporated in a product, a circuit board of the product is disposed on the back surface side of the wiring board, the wiring board and the circuit board are pressed together with an elastic connector therebetween, and the connector includes a conductor connecting the connection pins and the circuit board, and a dielectric elastic body.

Because the circuit board of the product in which the display device is incorporated is disposed to the back side of the wiring board, the connection pins and the pins of the circuit board can be easily interconnected by positioning the connector between the wiring board and the circuit board. This aspect of the invention stabilizes electrical conductivity by pressing the wiring board and the circuit board together with the elastic connector therebetween by a spring, for example.

In according to another aspect of the invention a plurality of connection pins corresponding to the same input/output pins are formed in each of a first position and a second position on the back surface of the wiring board, and a first pin group composed of a plurality of connection pins formed at the first position, and a second pin group composed of a plurality of connection pins formed at the second position, are formed on the back surface of the wiring board.

This aspect of the invention enables selecting the pin group that connects easily to the device-side pins from among the plural pin groups. More specifically, because the positions of the device-side pins are not limited to a specific position, the general applicability of the display device of the invention can be improved.

The invention is not limited to two pin groups, and three or more pin groups may be formed at mutually different positions on the back side of the wiring board.

Another aspect of the invention is a timepiece having the display device described above, and a circuit board located on the back surface side of the wiring board of the display device.

By using the display device described above, this aspect of the invention achieves the same operation and effect described above.

A timepiece according to another aspect of the invention has a hand attached to a shaft passing in the thickness direction through the display panel and the wiring board, and a drive wheel train that is disposed between the wiring board and the circuit board and drives the hand.

By layering the wiring board with the display panel, the member supporting the parts of the movement, including the drive wheel train, other wheel trains, and levers, can be disposed on the back side of the wiring board. This enables more efficiently arranging the parts in a combination timepiece in which an analog time display using hands is combined with digitally displaying content on a display panel, and the display panel also functions as a dial.

Further preferably, the timepiece also has a position detection sensor that is disposed on the back surface of the wiring board and detects the rotational position of a wheel contained in the drive wheel train or a wheel that moves in conjunction with the drive wheel train.

By thus locating the wiring board in the area on the drive wheel train side of the display device, the position detection sensor can be easily disposed near the wheel of which the position is to be detected.

The position detection sensor is used, for example, to detect when the time goes to the hour from the rotational position of the wheel, and is used to correct the displayed time based on the internal clock.

As described above, the invention enables reducing the width of the frame margin around the image display area, reduces the required housing space inside a device or product in which the display device is used, increases the utility of the pin positions, and makes connecting and disconnecting the display device to the device-side circuit board simple.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A first embodiment of the invention is described next with reference to FIG. 1 to FIG. 5. Note that in the following embodiments parts that are functionally the same as parts that have already been described are identified by the same reference numerals and further description thereof is omitted.

Figure 1:
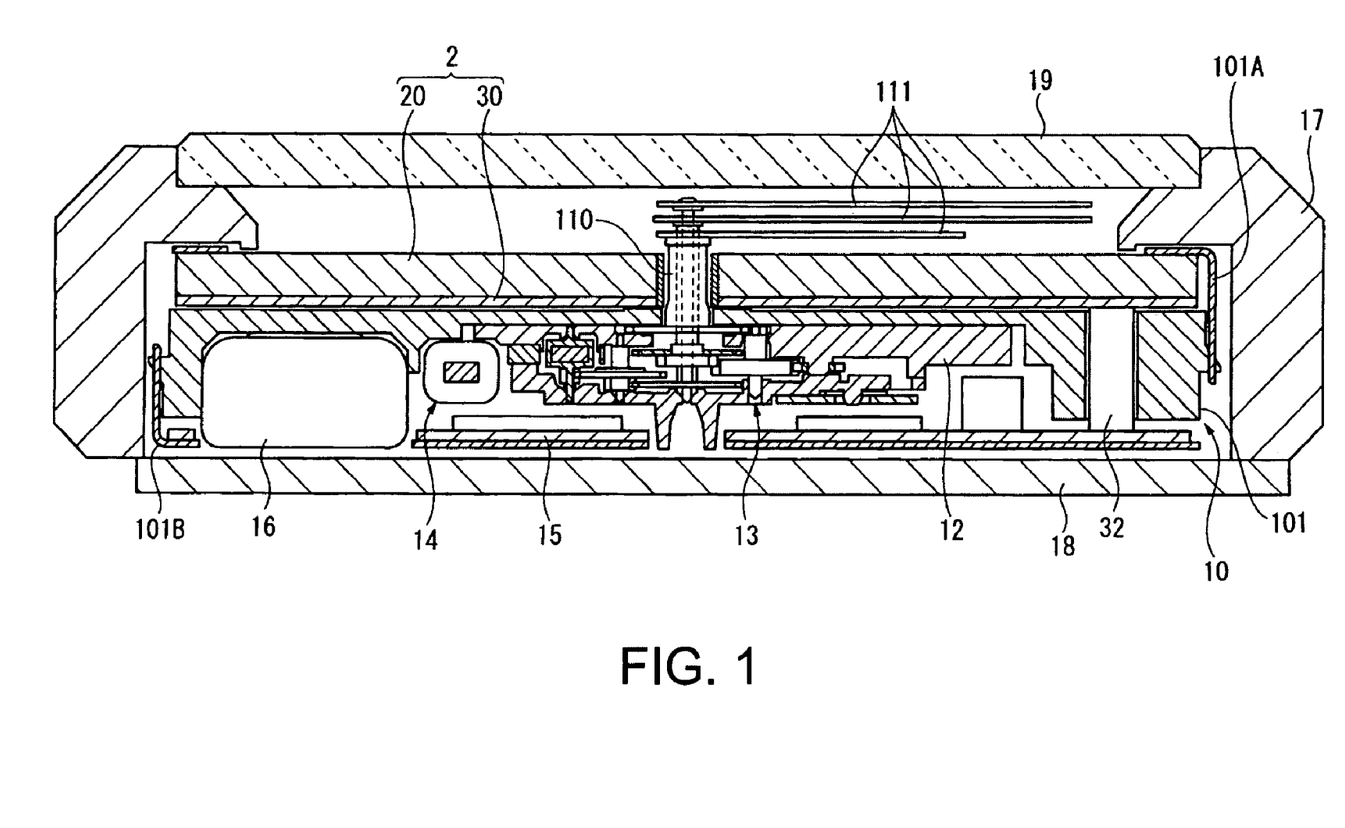
FIG. 1 is a side section view of a timepiece according to a first embodiment of the invention.
Figure 2:
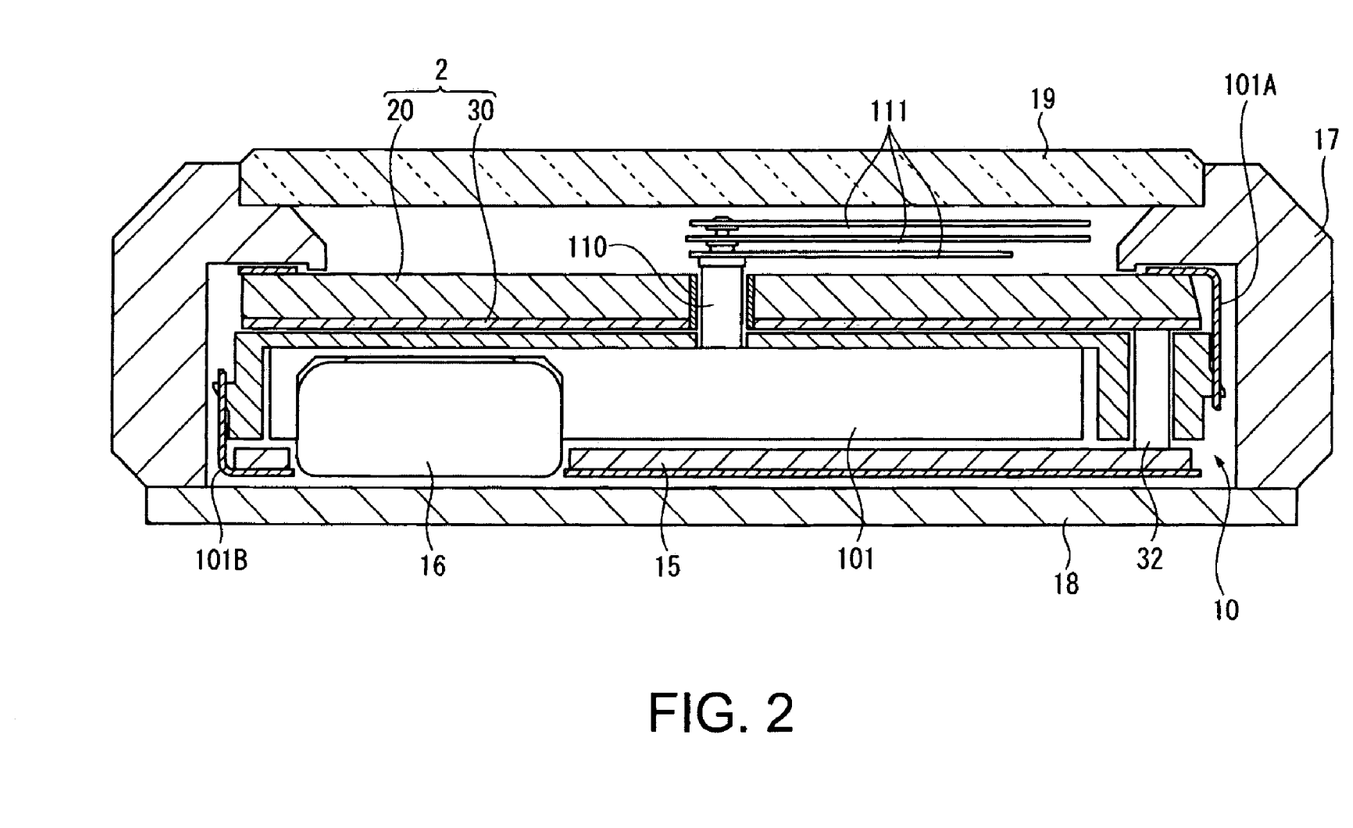
FIG. 2 is a side section view of the same timepiece.

FIG. 1 and FIG. 2 are side section views of a timepiece according to the present invention. The timepiece according to this embodiment of the invention is a combination watch having analog hands 11 for displaying the time and a digital display device 2. This timepiece has a base plate 12, a drive wheel train 13 and stepping motor 14 supported on the base plate 12, a circuit board 15 and a movement 10 including a battery 16 disposed on the opposite side of the base plate 12 as the display device 2, a case 17 housing the movement 10 and the display device 2, a back cover 18, and a crystal 19.

The display device 2 and the movement module 101 are held together in unison by a panel pressure spring 101A.

The circuit board 15 is populated with a timekeeping circuit including a crystal oscillator circuit and a frequency dividing circuit, a control IC, and capacitors. The circuit board 15 is assembled in unison with the movement module 101 by a circuit pressure spring 101B.

Figure 3:
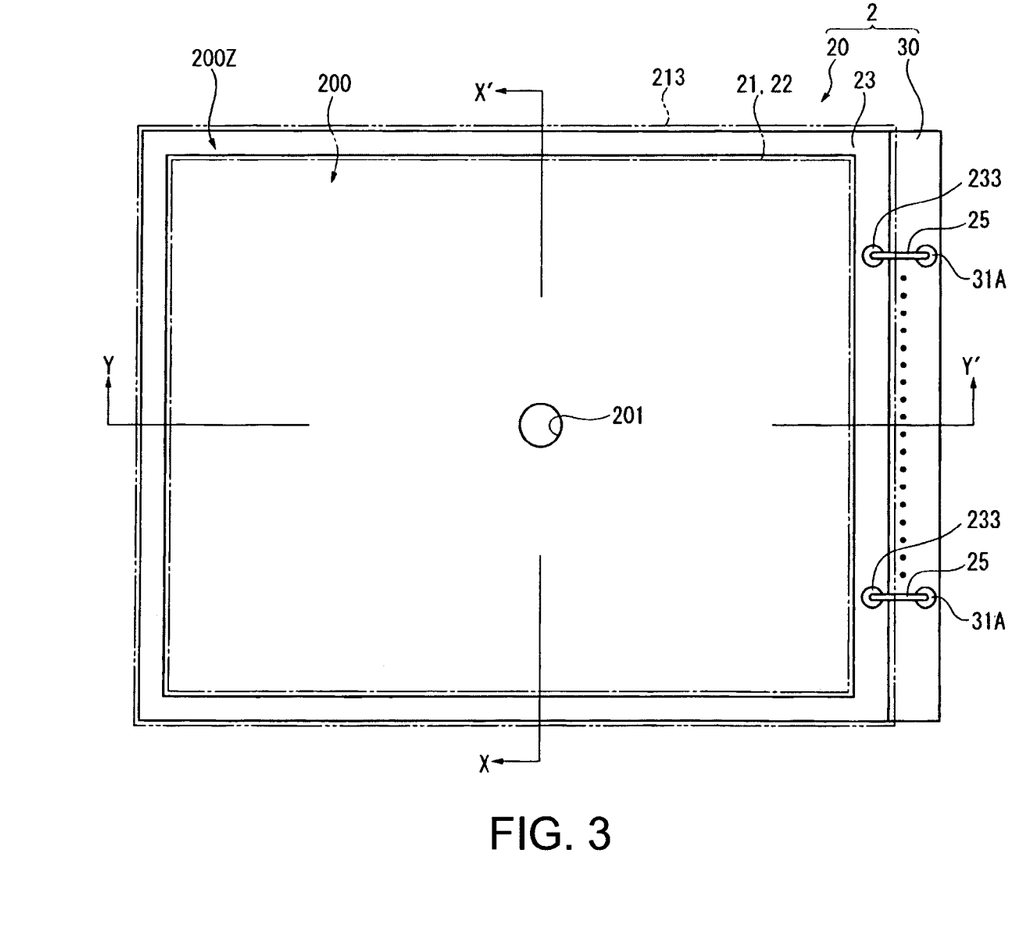
FIG. 3 is a schematic plan view of a display device incorporated in the timepiece.
Figure 4:
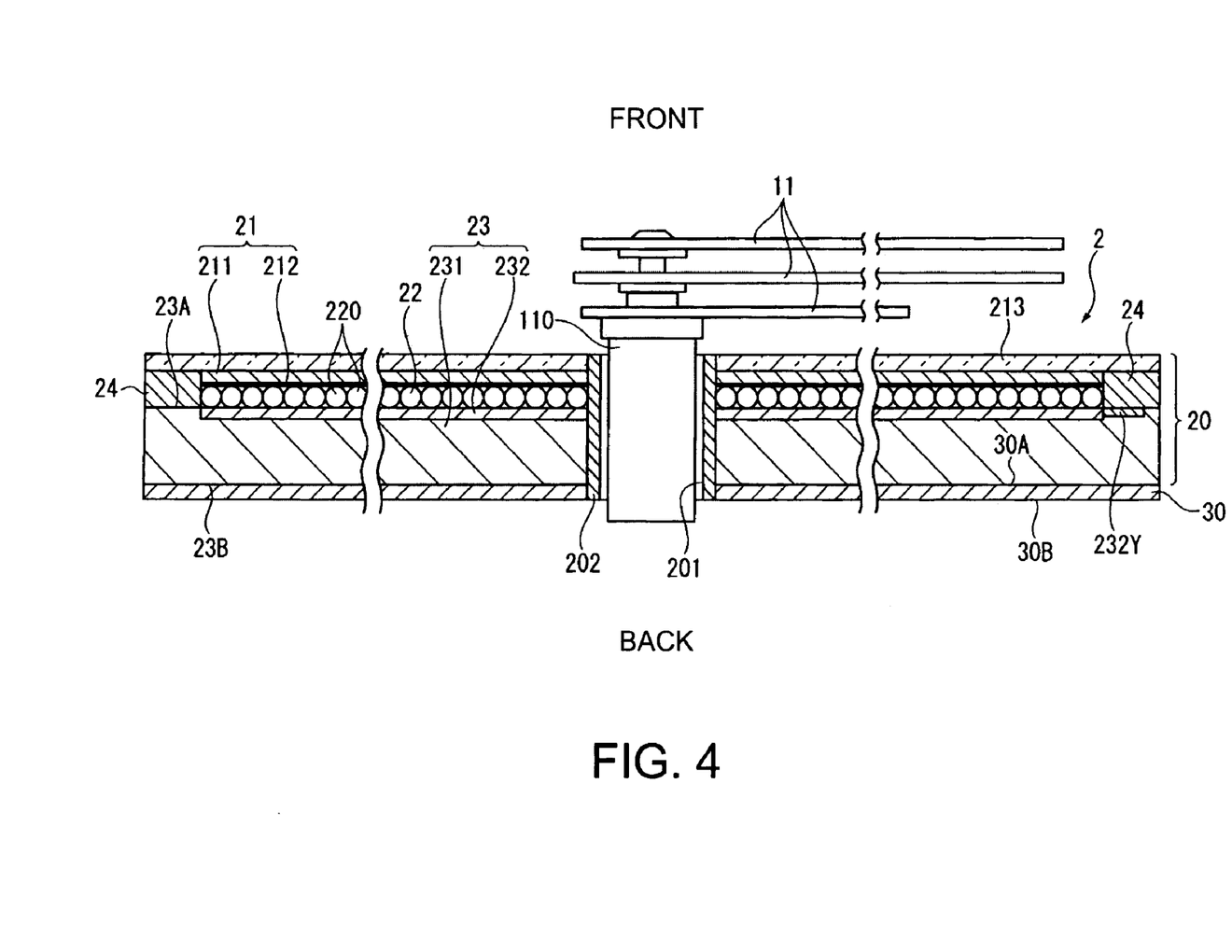
FIG. 4 is a section view through line X-X' in FIG. 3.
Figure 5:
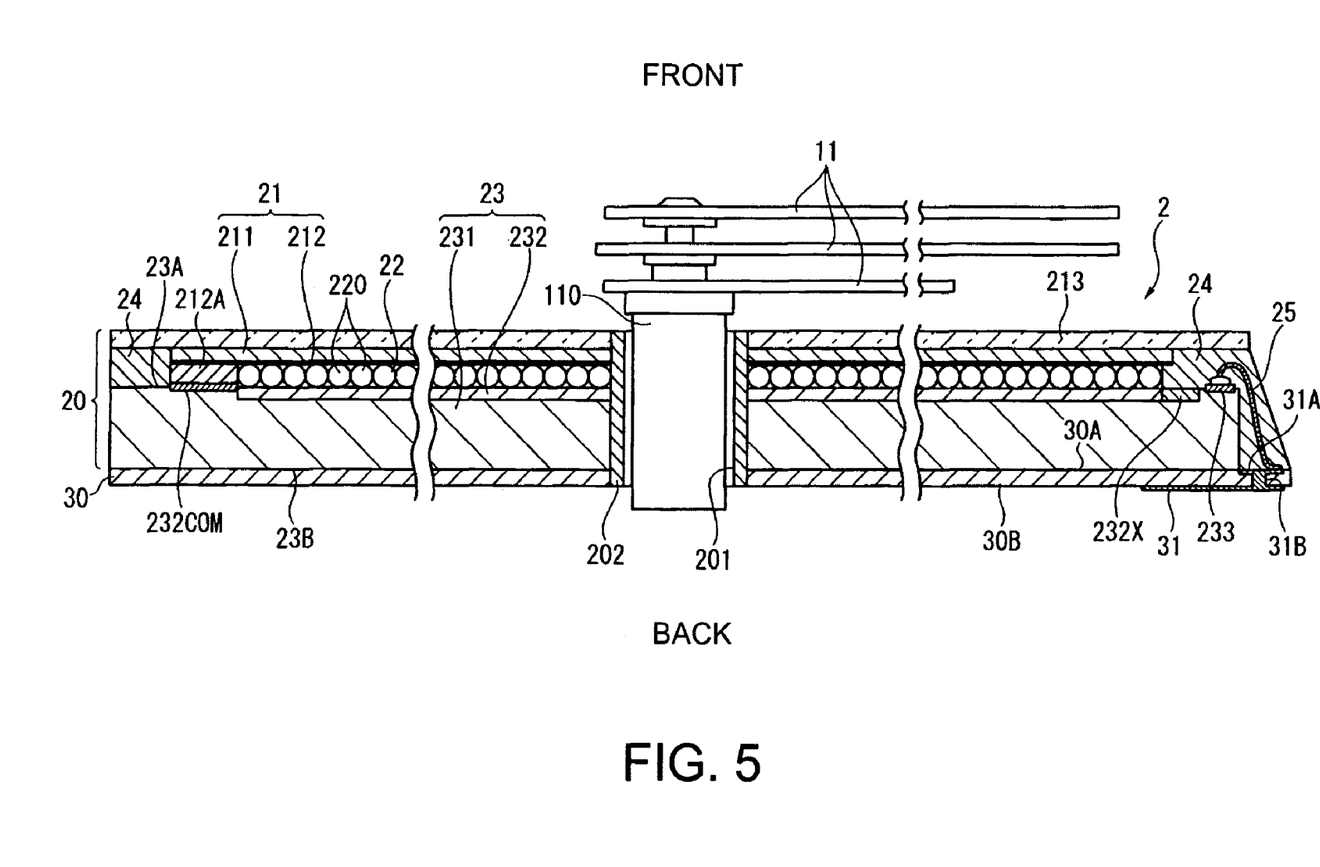
FIG. 5 is a section view through line Y-Y' in FIG. 3.

FIG. 3 is a plan view of a rectangular display device 2. FIG. 4 is a section view through line X-X' in FIG. 3, and FIG. 5 is a section view through line Y-Y' in FIG. 3.

In the following description of the display device 2, the "top" side or surface is the side on the top or front as seen in 4 and FIG. 5, and the "bottom" side or surface is the side on the bottom or back as seen in 4 and FIG. 5.

The display device 2 includes a display panel 20 and a wiring board 30 disposed on the back side of the display panel 20. The display panel 20 is a matrix drive electrophoretic display device in this embodiment of the invention. The display panel 20 and wiring board 30 are rendered layered together in a single module. A through-hole 201 through which passes the shaft 110 of the wheel and pinion to which the hands 11 are fastened (FIG. 4 and FIG. 5) is rendered in the center part of the display panel 20 and the wiring board 30. The area around the through-hole 201 is sealed with a sealant 202 (FIG. 4, FIG. 5) such as an epoxy resin.

The invention is not limited to an electrophoretic display device, and may be a liquid crystal display (LCD) or electroluminescent (ED) display device.

The display panel 20 in this embodiment of the invention is a layered construction including a front or top substrate 21, an electrophoretic layer 22 as an image forming unit, and a TFT (thin film transistor) layer 23 as a back substrate.

Note that in this embodiment of the invention the display panel 20 has a digital display function for displaying text, graphics, and images, and also functions as a timepiece dial. More specifically, the markers to which the hands 11 point are displayed on the display panel 20.

The top substrate 21 includes a polyethylene terephthalate (PET) sheet 211 and a common electrode (transparent electrode) 212 rendered by an ITO (indium tin oxide) coating applied to the back side of the PET sheet 211. Numerous microcapsules 220 rendering the electrophoretic layer 22 are attached by an adhesive or an adhesive film to the top substrate 21 in this embodiment of the invention. The area in which the microcapsules 220 are disposed is the image display area 200 of the display panel 20 shown in FIG. 3. A frame area 200Z surrounds the outside of the image display area 200.

A crystal 213 is bonded to the top surface of the top substrate 21.

Charged black electrophoretic particles and white electrophoretic particles that are charged oppositely to the black electrophoretic particles are contained inside the microcapsules 220 of the electrophoretic layer 22. The microcapsules 220 are shown in FIG. 4 and FIG. 5 much larger than actual size.

A sealant 24 such as an epoxy resin disposed around the outside edge portion of the electrophoretic layer 22 seals the electrophoretic layer 22 between the top substrate 21 and a TFT circuit board 23. The electrophoretic layer 22 is thus protected from humid environments and change in the characteristics of the electrophoretic particles is suppressed.

The sealant 24 is disposed to the back side of the crystal 213, around the edge portion of the top substrate 21, and on the top surface of the TFT circuit board 23, thereby assuring a tight seal.

The TFT circuit board 23 includes a glass substrate 231, pixel electrodes rendered in a matrix pattern on the top surface of the glass substrate 231, and a TFT layer 232 containing thin-film transistors. The display panel 20 in this embodiment of the invention is TFT driven, but a TFD (thin-film diode) drive method may be used instead.

A y-axis drive unit 232Y (FIG. 4), an x-axis drive unit 232X (FIG. 5), a common electrode conductor unit 232COM (FIG. 5), and a plurality of input/output pins 233 (FIG. 5) are rendered on the front surface 23A of the TFT circuit board 23. The y-axis drive unit 232Y is connected to each of the source lines disposed on the y-axis of the pixel electrodes. The x-axis drive unit 232X is connected to each of the gate lines disposed on the x-axis of the pixel electrodes. The common electrode conductor unit 232COM is connected through a conductive member 212A (FIG. 5) to the common electrode 212. The input/output pins 233 are connected to each of the drivers in the x-axis drive unit 232X, y-axis drive unit 232Y, and common electrode conductor unit 232COM. As shown in FIG. 3, the input/output pins 233 are arrayed along one short side of the TFT circuit board 23.

The wiring board 30 is a double-sided glass epoxy circuit board that is attached to the back side 23B of the TFT circuit board 23 by an adhesive or an adhesive film.

As shown in FIG. 5, a plurality of patterns 31A that are electrically connected to the input/output pins 233 by bonding wires 25 are formed on the front side 30A of the wiring board 30.

The bonding wires 25 bend from the front surface 23A of the TFT circuit board 23 through the thickness of the TFT circuit board 23 to the back side 23B, and are affixed by alloy bonding to the input/output pins 233 and patterns 31A.

Note that on the one short side of the display panel 20 to which the bonding wires 25 are disposed the sealant 24 is disposed along the edge part of the TFT circuit board 23 and the front side 30A of the wiring board 30 so that the bonding wires 25 are coated and isolated from each other by the sealant 24.

A plurality of connection pins 31 that are electrically connected through through-holes 31B to the patterns 31A on the front side 30A are formed on the back side 30B of the wiring board 30. A rubber connector 32 is disposed between the connection pins 31 and the circuit board 15 (FIG. 1), and the connection pins 31 are electrically connected by the rubber connector 32 to the power supply block and control circuit unit on the circuit board 15, and to the display panel 20 drive circuit mounted on the circuit board 15.

While not shown in detail, the rubber connector 32 has a plurality of conductors connecting the connection pins 31 to the circuit board 15, and a dielectric rubber elastic body that isolates the conductors from each other. The rubber connector 32 is compressed between the wiring board 30 and circuit board 15 by the panel pressure spring 101B (FIG. 1, FIG. 2), thereby stabilizing conduction between the connection pins 31 and circuit board 15.

The effect of this embodiment of the invention is described next.

(1) The display panel 20 and wiring board 30 of the display device 2 are layered together and the input/output pins 233 on the front surface 23A of the TFT circuit board 23 are electrically connected to the connection pins 31 by bonding wires 25 passing through the thickness of the TFT circuit board 23. The display device 2 thus constructed does not need a bonding area between the display panel 20 and wiring board 30 outside the image display area 200, and requires only enough space for the input/output pins 233 and the connection pins 31 that are connected by the bonding wires 25 outside the image display area 200, and the frame area 200Z can therefore be quite narrow.

(2) By rendering the display panel 20 and the wiring board 30 as a single module, less space is needed to house them inside the timepiece case 17.

Rendering the display panel 20 and the wiring board 30 as a single module also makes removing and installing the display device 2 during after-sales service simple.

(3) By layering the wiring board 30 with the display panel 20, the connection pins 31 can be formed at any suitable position on the back side 30B of the wiring board 30, and the display device 2 can be easily assembled into a wide range of timepiece models. Appropriately positioning the pins also helps to reduce the timepiece size.

(4) The connection pins 31 and the pins of the circuit board 15 can be easily electrically connected through the rubber connector 32 by forming the connection pins 31 on the back side 30B of the wiring board 30. More specifically, by simply placing the display device 2 on the movement 10 and engaging the panel pressure spring 101A with the outside edge part of the base plate 12, the connection pins 31 and circuit board 15 can be reliably electrically connected through the rubber connector 32.

(5) By using bonding wires 25 for conductivity between the input/output pins 233 and connection pins 31, the input/output pins 233 formed on the front surface 23A of the TFT circuit board 23 and the connection pins 31 formed on the back side 30B of the wiring board 30 can be rendered in less space in the plane direction of the display panel 20 than is possible using a lead harness. This enables further reducing the width of the frame area 200Z.

(6) The sealant 24 is used to seal the electrophoretic layer 22 and to seal the bonding wires 25, thereby simplifying construction.

(7) Conduction between the connection pins 31 and circuit board 15 is stabilized as a result of pressing the wiring board 30 and circuit board 15 together with the rubber connector 32 therebetween by the panel pressure spring 101A.

First Variation of the First Embodiment

Figure 6:
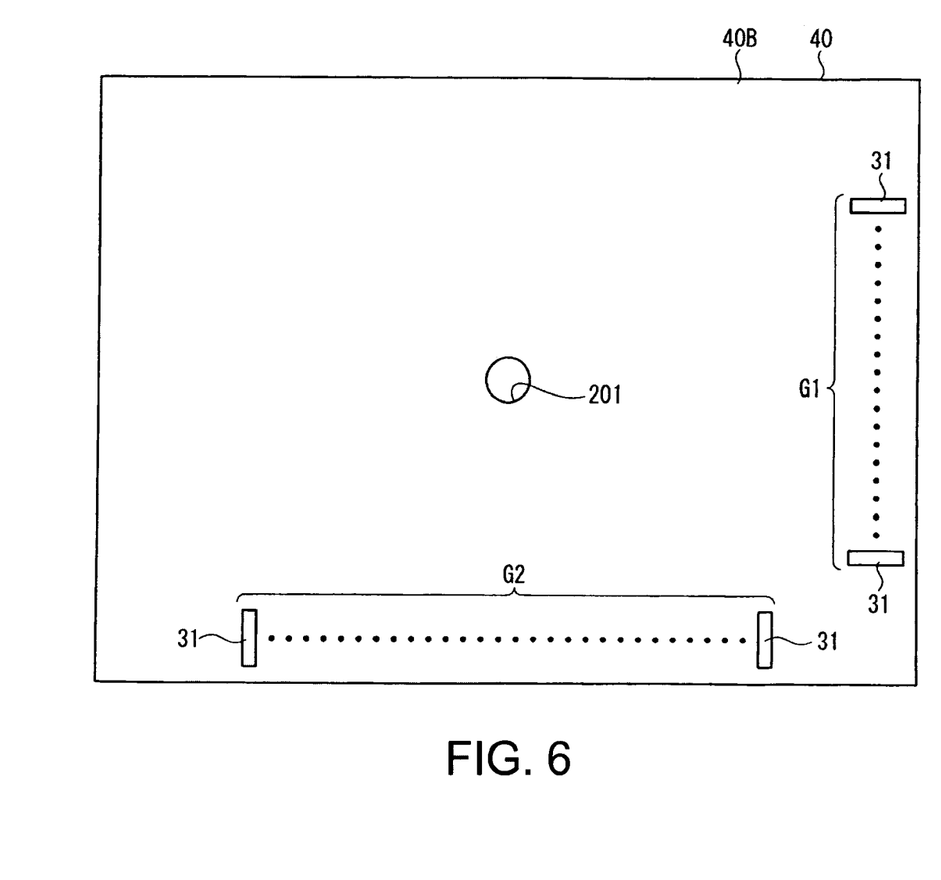
FIG. 6 is a schematic plan view from the back side of the wiring board in a first variation of the first embodiment of the invention.

FIG. 6 shows the back side 40B of the wiring board 40 in a first variation of the first embodiment. A plurality of connection pins 31 arrayed as a first pin group G1 in a direction along a short side of the wiring board 40, and a plurality of connection pins 31 arrayed as a second pin group G2 in a direction along a long side of the wiring board 40, are disposed to the back side 40B of the wiring board 40. These first and second pin groups G1 and G2 include connection pins 31 for the same input/output pins 233.

This configuration enables selecting the group of pins most easily connected to the pins of the circuit board 15 from among the plural pin groups G1 and G2. More specifically, this configuration improves general applicability because the positions of the device-side pins of the device in which the display device 2 is incorporated are not limited to predetermined positions.

Second Variation of the First Embodiment

Components of the movement 10 can be disposed on the back side part of the display device 2 described above. More specifically, a pressure plate for holding the drive wheel train 13 and other wheel trains and levers can be disposed to the back side 30B of the wiring board 30. This enables efficiently arranging parts in a combination timepiece in which the display panel 20 functions as the dial, and thus enables reducing the size of the timepiece.

Embodiment 2

Figure 7:
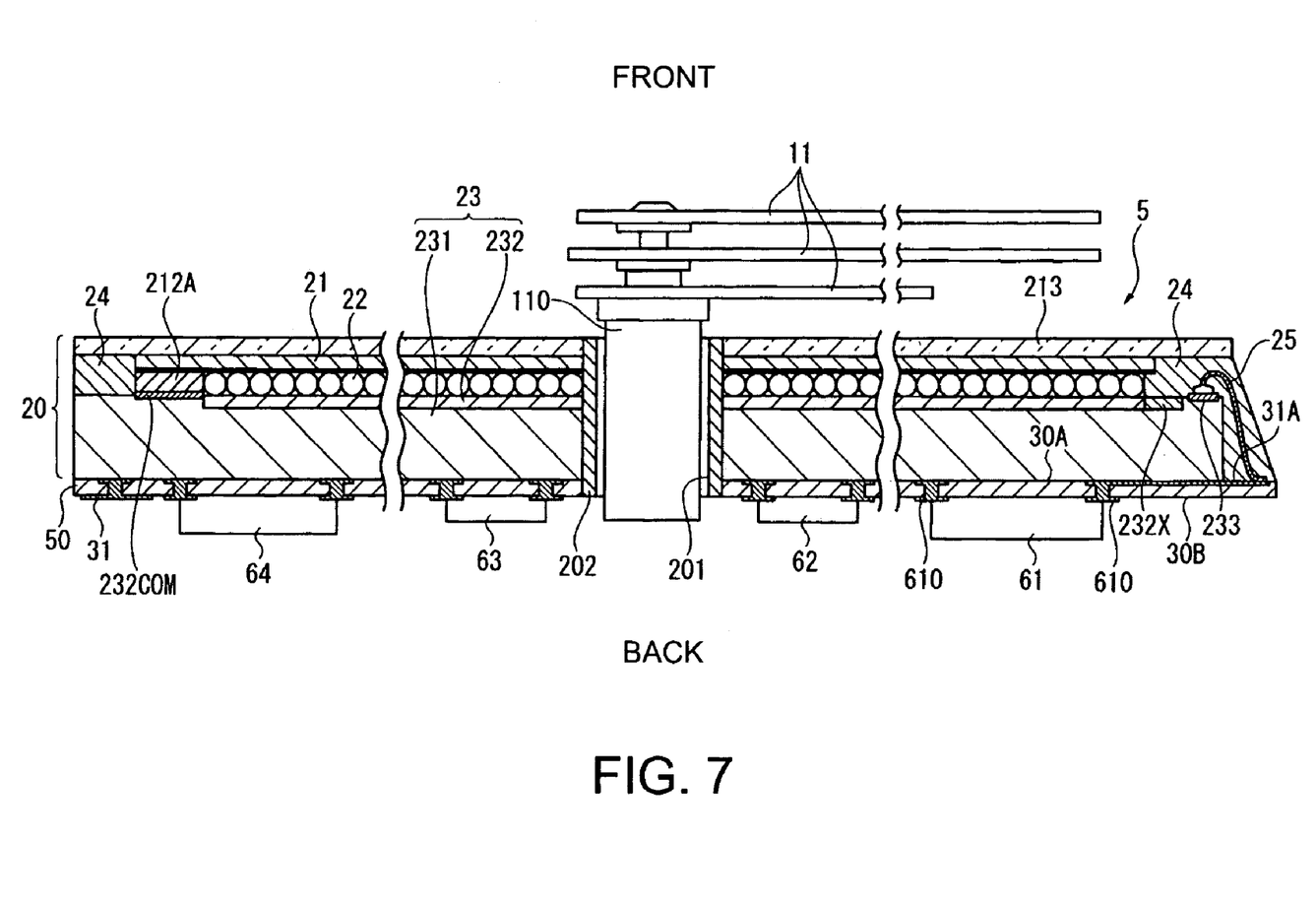
FIG. 7 is a schematic section view of a display device according to a second embodiment of the invention.

A second embodiment of the invention is described next with reference to FIG. 7. FIG. 7 is a schematic section view of the display device 5 according to this embodiment of the invention. A plurality of electronic components 61 to 64 are mounted on the back side 30B of the wiring board 50 of the display device 5. These electronic components include a drive circuit IC 61 for the display panel 20, a temperature sensor 62, and a photodetector 63 such as a photodiode rendering a position detection sensor for sensing the rotational position of the wheels to which the hands 11 are attached A plurality of pins 610 on the back side 30B of the wiring board 50 are electrically connected through vias to the patterns 31A on the front side 30A of the wiring board 50. Connection pins 31 that are conductive to selected input/output pins 233 through the patterns 31A are formed on the back side 30B of the wiring board 50.

The temperature sensor 62 is disposed at a position corresponding to the image display area where the electrophoretic layer 22 is disposed, and the temperature sensor 62 detects a temperature close to the temperature of the electrophoretic layer 22. The drive circuit IC 61 controls driving the display panel 20 based on the temperature detected by the temperature sensor 62.

A position detection sensor in this embodiment of the invention includes a light emitting device such as an LED (light-emitting diode) mounted on the circuit board 15 at a position behind the wheel and pinion, and a photodetector 63 mounted on the back side 30B of the wiring board 50 for detecting the light emitted from the light emitting device. The photodetector 63 detects the light from the light emitting device through a hole rendered in the wheel and pinion when the hands 11 point to the hour. The displayed time can be adjusted by controlling driving the drive wheel train based on the internal time kept by the timekeeping circuit when this hand position is detected.

The position detection sensor is not limited to an optical sensor, and could be a magnetic sensor using a Hall effect device.

This embodiment of the invention has the following effects in addition to the effects of the first embodiment described above.

(8) Because the drive circuit IC 61 of the display panel 20 is mounted on the back side 30B of the wiring board 50, the length of the wiring pattern connecting the display panel 20 and the drive circuit can be shortened compared with a configuration in which the display panel 20 drive circuit is mounted on the device-side circuit board 15. Electrical resistance is thus lower and power consumption can be reduced accordingly.

(9) The electrophoretic characteristics of the electrophoretic particles change with temperature, but the display quality of the display panel 20 can be assured by controlling driving the display panel 20 according to the temperature detected by the temperature sensor 62. The temperature sensor 62 is disposed to the back side 30B of the wiring board 50 that is layered in unison with the display panel 20, and the temperature sensor 62 detects a temperature close to the temperature of the display panel 20. Driving the display panel 20 can therefore be appropriately controlled based on the temperature detected by the temperature sensor 62.

(10) By locating the wiring board 50 in an area on the drive wheel train 13 side of the display device 5, locating the parts of the position detection sensor (photodetector 63) near the wheel and pinion to be detected is easier.

A double-sided circuit board is used for the wiring board in the foregoing embodiments of the invention, but the invention is not so limited and a single-sided circuit board may be used for the wiring board. When through-via interconnects are not rendered in the wiring board, the conductor members may be wrapped to the back side of the wiring board and conductively connected to the input/output pins and connector pins.

The best modes and methods of achieving the present invention are described above, but the invention is not limited to these embodiments. More specifically, the invention is particularly shown in the figures and described herein with reference to specific embodiments, but it will be obvious to one with ordinary skill in the related art that the shape, material, number, and other detailed aspects of these arrangements can be varied in many ways without departing from the technical concept or the scope of the object of this invention.

Therefore, description of specific shapes, materials and other aspects of the foregoing embodiments are used by way of example only to facilitate understanding the present invention and in no way limit the scope of this invention, and descriptions using names of parts removing part or all of the limitations relating to the form, material, or other aspects of these embodiments are also included in the scope of this invention.

What is claimed is:

1. A display device, comprising:
   a display panel having a front substrate, an image forming unit, and a back substrate rendered together in layers;
   a wiring board layered on a back surface of the back substrate;
   a plurality of input/output pins formed on a front surface of the back substrate; and
   a plurality of connection pins formed on a back surface of the wiring board that are electrically connected to the input/output pins by respective conductor members, wherein:
   the image forming unit is sealed between the front substrate and the back substrate by a sealing member disposed in an area including an outside edge part of the image forming unit;
   the sealing member covers the conductor members;
   the wiring board comprises a double-sided circuit board having conductors on both front and back surfaces; and
   the connection.pins have through-holes passing through the wiring board.

2. The display device described in claim 1, wherein the image forming unit contains electrophoretic particles.

3. The display device described in claim 1, wherein the conductor members comprise bonding wires.

4. The display device described in claim 1, further comprising:
   a drive circuit that drives the display panel disposed on the back surface of the wiring board.

5. The display device described in claim 1, further comprising:
   a temperature sensor disposed on the back surface of the wiring board.

6. The display device described in claim 1, wherein:
   the display device is incorporated in a product having a circuit board that is disposed on the back surface side of the wiring board;
   the wiring board and the circuit board are pressed together with an elastic connector therebetween; and
   the connector includes a conductor connecting the connection pins and the circuit board, and a dielectric elastic body.

7. The display device described in claim 1, wherein:
   a plurality of connection pins corresponding to the same input/output pins are formed in each of a first position and a second position on the back surface of the wiring board; and
   a first pin group composed of a plurality of connection pins formed at the first position, and a second pin group composed of a plurality of connection pins formed at the second position, are formed on the back surface of the wiring board.

* * * * *